(12) United States Patent
Pipitone

(10) Patent No.: US 6,393,143 B1
(45) Date of Patent: May 21, 2002

(54) TECHNIQUE FOR ESTIMATING THE POSE OF SURFACE SHAPES USING TRIPOD OPERATORS

(75) Inventor: Frank Pipitone, Temple Hills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/457,007

(22) Filed: Dec. 8, 1999

(51) Int. Cl.[7] .................................................. G06K 9/00
(52) U.S. Cl. ........................ 382/154; 345/653; 345/679
(58) Field of Search ................................ 382/154, 156, 382/281; 345/653, 679, 672; 356/12; 128/925; 706/15; 708/403

(56) References Cited

U.S. PATENT DOCUMENTS

| | | | |
|---|---|---|---|
| 5,497,430 A | 3/1996 | Sadovnik et al. | 382/156 |
| 5,638,465 A | 6/1997 | Sano et al. | 382/281 |
| 5,870,136 A | 2/1999 | Fuchs et al. | 348/42 |

OTHER PUBLICATIONS

Pipitone: Tripod Operators for the Interpretation of Range Images: NRL Memo, ROT. No. 6780, Feb. 91.
Piptone et al.; Tripod Operators for Recognizing Objects in Range Images: Rapid Rejection of Library Objects: IEEE Proc. in Robotics and Automation Conf; Nice, France, May 1992.
Pipitone et. al.; Rapid Recognition of Freedom Objects in Noisy Range Images Using Tripod Operators; IEEE Conf. on Computer Vision and Pattern Recognition; New York, NY; pp. 715–716, 1993.
Pipitone; Tripod Operators for Realtime Recognition of Surface Shapes in Range Images: NASA Tech, 2004 Symp, Washington, DC, Nov. 94.

Primary Examiner—Samir Ahmed
(74) Attorney, Agent, or Firm—John J. Karasek; John Gladstone Mills, III

(57) ABSTRACT

A software procedure, with associated hardware, for estimating the pose of an object from a range image containing the object. A range image is a two dimensional array of numbers which represent the distances from a reference point in the range imaging instrument to observed surface points in a scene. All six parameters of the pose of an object are estimated; three translational and three angular parameters. A new technique known as "non-pose-distinctive placement removal" is combined with of tripod operators (TOs), a method for interpreting range images, and is comprised of two steps. The first is training the system on a new object so that it will later be able to estimate the pose of that object when seen again in some range image. The second is the actual pose estimation, where a TO is placed at a random location on a new range image containing the object of interest. Then the nearest neighbor in feature space, the nearpoint, is computed. If the distance to the nearpoint is less than some appropriate threshold, then the surface is recognized and pose estimation proceeds by computing the six pose parameters of a central triangle of the new placement in the coordinate system of the range imaging instrument. Then the pose parameters associated with the nearpoint are retrieved. An estimate of the pose of the surface shape in the new image is recoverable using those two pose six-vectors; the pose of the central TO triangle in the new image and the retrieved pose of the central TO triangle in the training image are composed together to determine an estimate where the object actually is with respect to the location of its original model used in training.

4 Claims, 5 Drawing Sheets

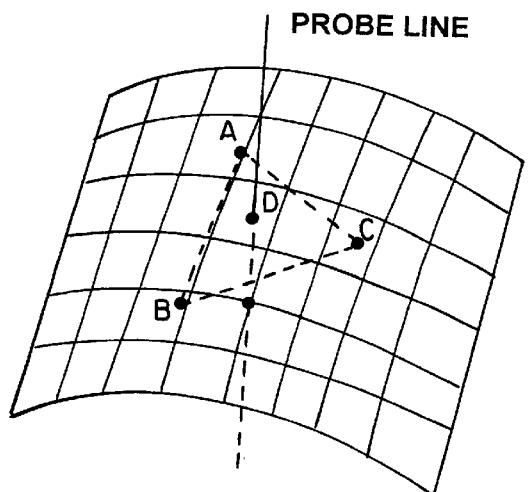
FIG. 1a
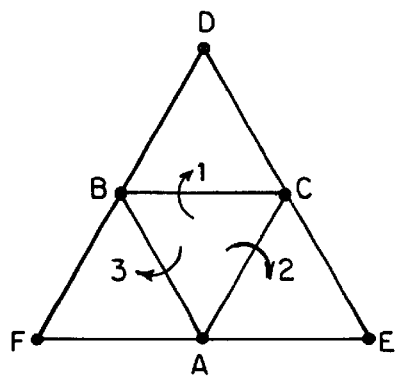
FIG. 1b
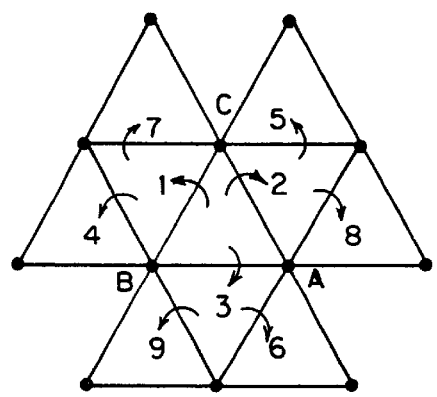
FIG. 1c
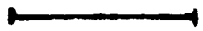
FIG. 2a
FIG. 2b
FIG. 2c
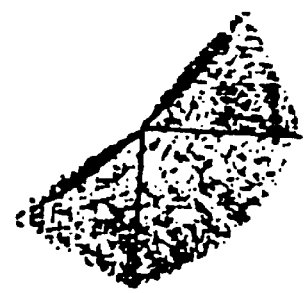
FIG. 2d

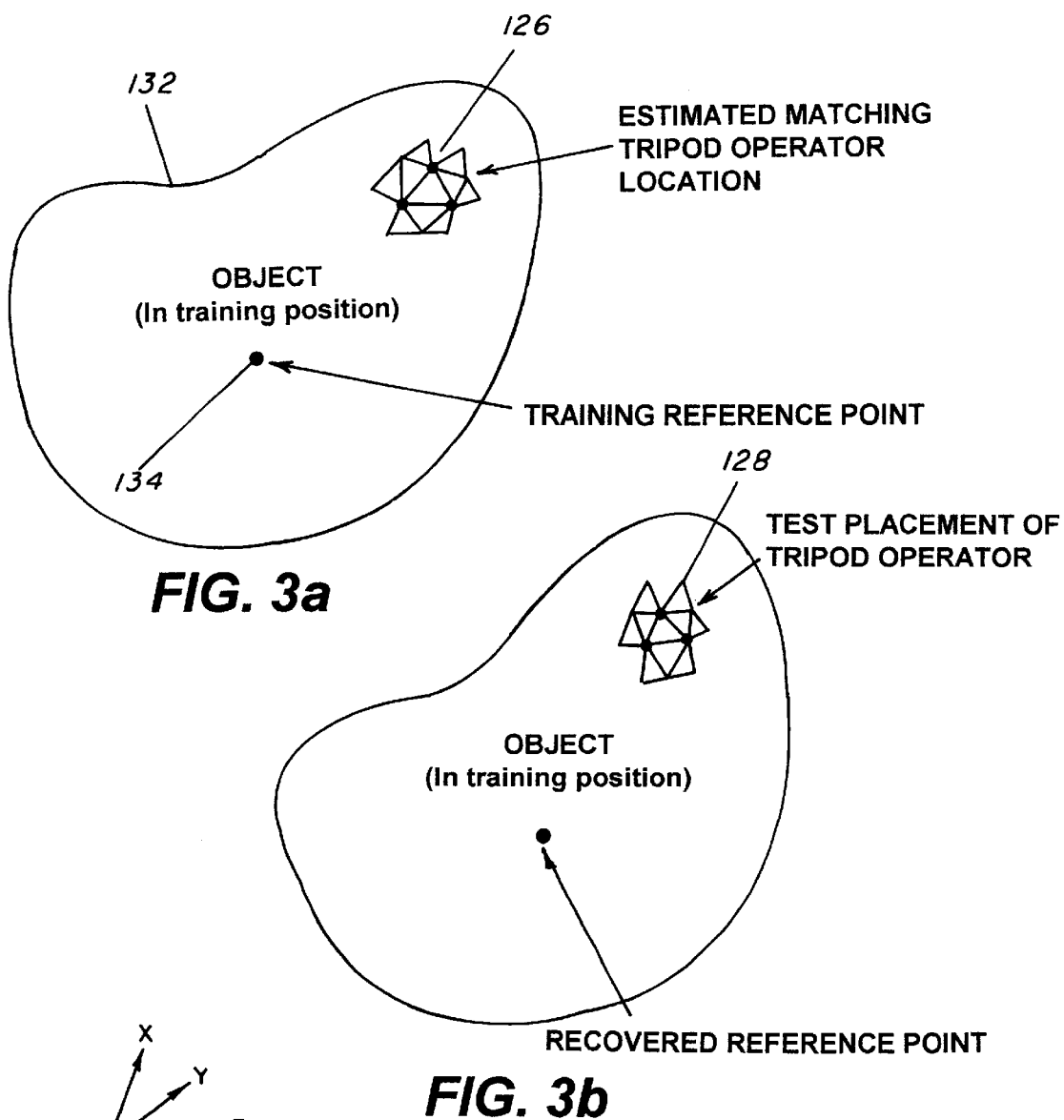

TECHNIQUE FOR ESTIMATING THE POSE OF SURFACE SHAPES USING TRIPOD OPERATORS

BACKGROUND OF THE INVENTION

1. Field of the Invention

This invention pertains generally to a technique for recognizing and locating objects and more specifically a technique for estimating the pose of an object from a range image containing the object.

2. Description of the Related Art

In recent decades, a wide variety of instruments have been built to obtain range images; a range image being a two-dimensional array of numbers which gives the depth of a scene along many directions from a central point in the instrument. Instead of measuring the brightness of many points in a scene, as in a television camera, these instruments measure where each point is in a three-dimensional space. Both range images and the more conventional intensity images from digital cameras have been used in the computer vision research community to determine the pose of observed objects. The term "object", as used herein, means a particular surface shape. "Pose" means a complete description of an object's position and orientation. For a rigid object this requires six numbers, such as X, Y, Z, pitch, yaw and roll, or six equivalent coordinates. The previous methods for pose estimation all suffer from either a lack of generality or from time inefficiency.

It is possible to do pose estimation using tripod operators (TO). See, Pipitone; TRIPOD OPERATORS FOR THE INTERPRETATION OF RANGE IMAGES; NRL Memorandum Report 6780, February 1991 for a crude and incomplete discussion. Tripod operators are a versatile class of feature extraction operators for surfaces. They are useful for recognition and/or localization (pose estimation) based on range or tactile data. They extract a few sparse point samples in a regimented way so that N surface points yield only N−3 independent scalar features containing all the pose-invariant surface shape information in these points and no other information. They provide a powerful index into sets or prestored surface representations. A TO consists of three points in 3-space fixed at the vertices of a triangle and a procedure for making several "depth" measurements in the coordinate frame of the triangle, which is placed on the surface like a surveyor's tripod. TOs can be embedded in a vision system in many ways and applied to almost any surface shape.

As stated above, a TO consists of three points in space fixed at the vertices of a triangle of fixed edge lengths and a procedure for making several depth measurements in the coordinate frame of the triangle, which is placed on the surface like a surveyor's tripod. These measurements take the form of arc-lengths along "probe curves" at which the surface is intersected. FIGS. 1a through 1c shows three examples of TO's. FIG. 1a shows a very simple TO with one line probe fixed symmetrically with respect to the rigid triangle ABC. The single scalar feature is the distance from the plane of ABC at which the probe intersects the surface. This resembles a mechanical optician's tool called a spherometer. The number d of scalar features is called the order of the operator. FIGS. 1b and 1c show TO's that can be viewed as a set of equilateral triangles hinged together so that all d+3 points can be made to contact a surface. The angles of the d hinges are the features. This type, called linkable TO's, is preferred because of their symmetry and uniform sensitivity to noise. The application if this TO to a planar surface yields $\phi \equiv 0$ for all the hinges. Many variations of these TO's could be constructed. Feature noise is related to range noise n by the approximate expression $n_\phi \approx 51 \times n/e$, where $n_\phi$ is the feature error in degrees, and n is expressed in the same distance units as the edge length e.

From an N-point TO, the N sampled surface points yield only N−3 independent scalar features, and the order d is N−3. These features contain all the surface shape information in the 3N components of the points since they suffice to reconstruct the relative positions of the N points. They contain no other information. For example, they have complete six DOF invariance under rigid motions, the group $R^3 \times SO(3)$. Thus, they depend upon where the tripod lies on the surface, but upon nothing else. A key property is that for any dimensionality d of feature vector only a 3 (or fewer)-dimensional manifold of feature space points can be generated from a given surface, since the tripod can be moved in only 3 DOF on a surface. This allows objects to be densely sampled with TOs at preprocessing time with a manageable number of operator applications, typically a few thousand, to obtain almost all of the possible feature vector values obtainable from any range image of the object. This set is a kind of invariant signature. For brevity, this is called the signature of the object or surface, with respect to a particular type TO. It can be stored in an array of bins in feature space, e.g., of dimension 3 or 4, for later efficient access of near neighbors to TO features measured at recognition time. These bins can optionally contain precomputed probability densities, analytic expressions for distances to nearby signature manifolds, and partial or complete descriptions of the relative poses of tripods and models, all to serve various purposes in a recognition system.

Since in some applications of the tripod operator, the computation consists only of placement and a little indexing, the cost of placing the operator should be kept small. This can be done by efficiently implementing a procedure similar to the following. Consider placing the TO's of FIGS. 1b or 1c on a dense range map. Point A can be chosen as any point on the image surface. Interpolation is to be done locally as needed, e.g., using piecewise triangular facets. Point B can be found by moving along a line at orientation α in image coordinates, pixel indices, until the 3D distance $|AB| \equiv e$. This can be done in logarithmic time, essentially constant here, using binary search. Then the circle of the radius $0.5\sqrt{3}$ e oriented coaxially around the center of the segment AB, using binary search, to find a point C close to the surface. A similar circular search yields each remaining point. A key step in the circular search is the mapping, specific to a range scanner's geometry, from a point (x, y, z) to the two indices of the range pixel whose ray (x, y, z) lies on. This allows the front/behind decision required by the binary search. In the case of a sequential random access range scanner, it may be efficient to monotonically search elliptical paths in image coordinates until the two distances being enforced, e.g., |AC| and |BC|; are both correct. The ellipses here are the projections of the previously described circles onto image coordinates. Finally, in the case of a tactile TO, the computation is mechanical; the feature values are to be read from position transducers, e.g., from linear potentiometers by an analog-to-digital (A/D) converter.

The following are a few of the symmetry properties of TOs of the types of FIGS. 1b and 1c.

Surfaces with one symmetry, such as extrusions, surfaces of revolution, and helical projections produce only a 2-dimensional manifold in feature space (for FIGS. 1b and 1c). Cylinders, having two symmetries, produce only a nearly circular 1-dimensional curve, and spheres a single point. Scaling a TO by changing its edgelength does not affect the signature of surfaces swept by a line with one point fixed, e.g., cones, planar n-hedral vertices, and planar dihedral edges. Regardless of the surface, an operator with a 3-fold symmetry, e.g., those in FIGS. 1b and 1c, produces signatures unchanged by cyclically permuting each triple of corresponding features. In FIG. 1c, the three 3-cycles (1, 2, 3), (4, 5, 6) and (7, 8, 9) show this property, for features $\phi_1$ through $\phi_9$, respectively. This allows a 3-fold storage reduction, e.g., by permuting the features so that $\phi_1$ is the largest. If the TO, in addition, has handedness symmetry, the signature can be modified by a procedure that allows recognition of the "other side" of any surface already recognizable. This is called inversion of a signature. It is done by transposing certain pairs of corresponding features, e.g., (7,5), (1,2), (4,8), and (6,9) in FIG. 1c, and replacing each feature value with $-\phi$. Also, the signature of the opposite-handed (reflected) version of a surface can be found by performing those transpositions without negating the features.

The signatures of order 3 operators, FIG. 1b, were rendered as a rotating cloud of points on a computer, selected 2D snapshots are shown in FIGS. 2a through 2d. In a special case of "smooth" surface regions, the signature is nearly a circular ring coaxial with the diagonal axis. The offset and radius of the ring can be readily used to compute estimates of the principle curvatures and other differential geometric parameters. Surfaces with $C_1$ or $C_2$ discontinuities tend to produce signatures with similar numbers and kinds of discontinuities, e.g., FIGS. 2c and 2d, and have roughly commensurate complexities of description. Thus, this umbrella-shaped 2-manifold can be well approximated with a few polynomials, whereas the discrete signature might need 20,000 points for thorough saturation.

This operator (in the inventions preferred form, the linkable TO) is essentially a 3D simulated structure consisting of several triangles hinged together. It is applied to a computer-represented surface, such as range image, by moving it until all of its points lie on that surface. Then the "hinge angles" provide information about the shape of the surface.

In a simplified application of tripod operators, there are two major steps. The first is training the system on a new object so that it will later be able for the system to recognize (or estimate the pose of) that object when seen again in some range image. The second step is the actual recognition (or, pose estimation).

SUMMARY OF THE INVENTION

The objective of this invention is to provide a technique for estimating the pose of surface shapes in six degrees of freedom from a range image containing an object possessing such a surface shape.

This and other objectives are accomplished by using a software procedure, with associated hardware, for estimating the pose of an object from a range image containing the object. A range image is a two dimensional array of numbers which represent the distances from a reference point in the range imaging instrument to observed surface points in a scene. All six parameters of the pose of an object are estimated; three translational and three angular parameters. This technique involves combining the previously existing method called tripod operators (TOs) with a new technique known as "non-pose-distinctive placement removal" and with other new ideas. TOs are 3 geometric procedures which obtain small sparse sets of points from range images in a regimented way. They are useful for surface shape recognition and pose estimation. The technique is composed of two steps. The first is training the system on a new object so that it will be later able to estimate the pose of that object when seen again in some range image. The second is the actual pose estimation, where a TO is placed at a-random location on a new range image containing the object of interest. Then the nearest neighbor in the TO feature space signature from the training data is computed. If the distance to the nearpoint is less than some appropriate threshold, then the surface is recognized and pose estimation proceeds by computing the six pose parameters of a central triangle of the new TO placement in the coordinate system of the range imaging instrument. Then the pose parameters associated with the nearpoint are retrieved. An estimate of the pose of the surface shape in the new image is recovered using those two pose six-vectors; the pose of the central TO triangle in the new image and the retrieved pose of the central TO triangle in the training image are composed together to determine an estimate where the object actually is with respect to the location of its original model used in training.

BRIEF DESCRIPTION OF THE DRAWINGS

FIG. 1a shows a simple TO with one line probe fixed symmetrically with respect to the rigid triangle ABC.

FIG. 1b shows an order 3 "linkable" TO that can be viewed as a set of equilateral triangles hinged together so that all d+3=6 points can be made to contact a surface.

FIG. 1c shows an order 9 "linkable" TO that can be viewed as a set of equilateral triangles hinged together so that all d+3=12 points can be made to contact a surface.

FIG. 2a shows a 2D projection of TO signatures taken with the TO of FIG. 1b with superimposed signatures of six hyperbolic paraboloid patches, four elliptic patches, and 10 spheres.

FIG. 2b shows a 2D projection of a TO signature of a torus taken with the TO of FIG. 1b whose signature is a piece of cone in $\phi_1$ $\phi_2\phi_3$ space.

FIG. 2c shows a 2D projection of a TO signature of a 90° planar dihedral taken with the TO of FIG. 1b, viewed diagonally.

FIG. 2d shows a 2D projection of a TO signature of a 90° planar dihedral taken with the TO of FIG. 1b, viewed along the $\phi_1$ axis.

FIG. 3a shows a pictorial reference for describing the geometry of pose estimation using tripod operators and shows pose estimation using training with a tripod operator shown on the object the training position.

FIG. 3b shows a pictorial reference for describing the geometry of pose estimation using tripod operators and shows pose estimation with a tripod operator in the test position. shows a pictorial reference for describing the geometry of pose estimation using tripod operators.

DESCRIPTION OF THE PREFERRED EMBODIMENT

Figure 4:
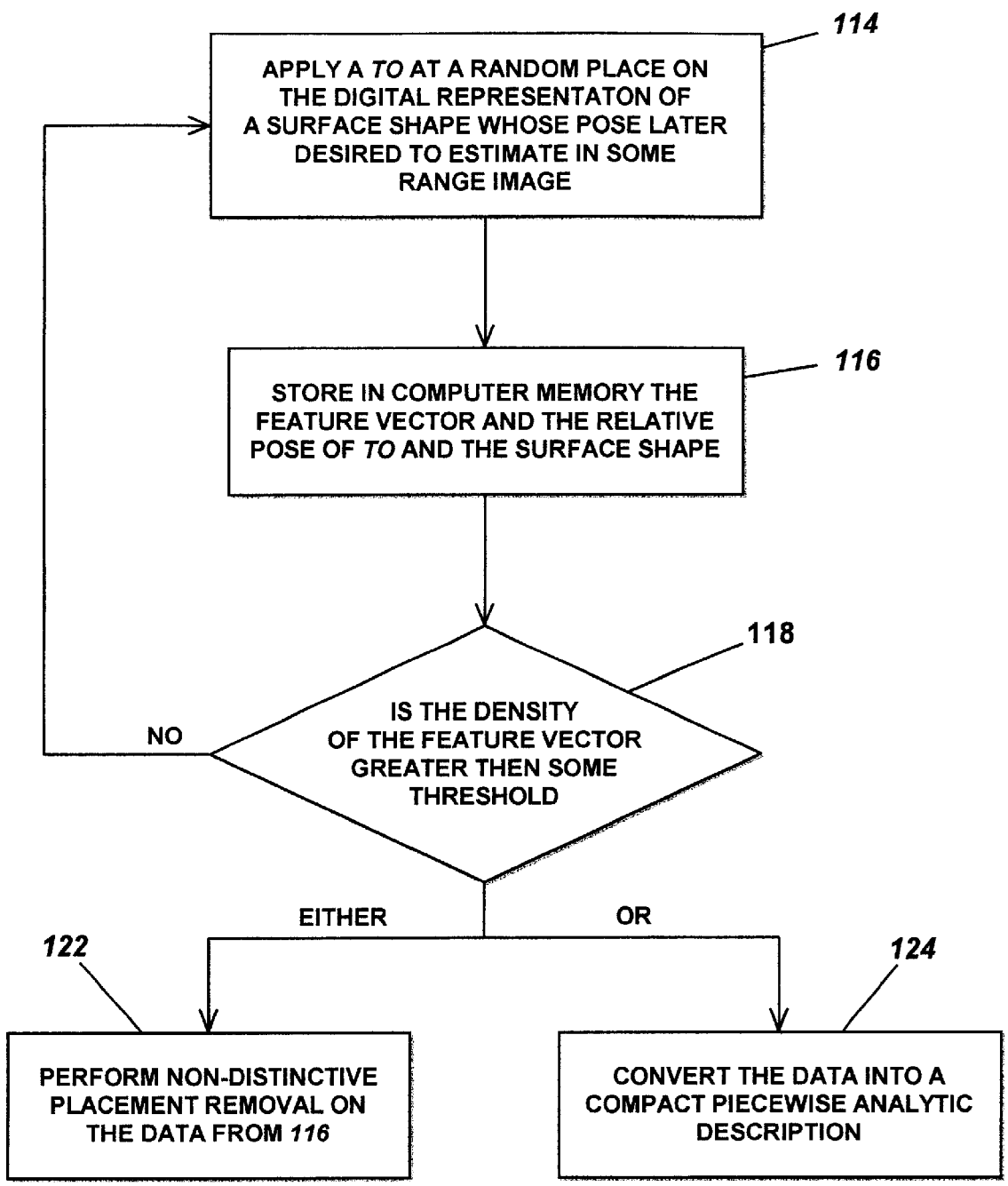
FIG. 4 shows a flow chart for generating the prestored or training data.

In the primary embodiment of this invention the estimation of pose is the primary subject, relying on parts of the surface which do not possess any pose-confusing symmetry. This is accomplished using a technique known as "non-pose-distinctive placement removal" together with other procedures implementing in a software system called TRIPOD developed by the Naval Research Laboratory, Washington, D.C., which allows various experiments to be performed involving the application of various kinds of tripod operators (TOs) to real and synthetic range images.

The tripod operator (TO) is now described in a general way so that all variations of it which are likely to be useful as a part of the pose estimation method will be included in this definition of a tripod operator. The TO is a computational procedure to be applied to a computer representation of a surface shape, such as a range image or CAD model, called the "surface". Associated with a given kind of TO are three points, A, B, and C in 3-dimensional space. They are constrained to be at fixed distances from one another. Thus, |AB|, |AC| and |BC| are fixed positive real numbers, not necessarily equal. The three points are otherwise free to move with respect to the surface. Thus ABC can be regarded as a rigid triangle, free to be moved around.

Also associated with a given kind of tripod operator are one or more "probe curves". The probe curves are curved lines whose purpose is to extract shape measurements from a surface. In applying a TO to a surface, first, the points A, B and C are moved so that all three lie on the surface, subject to the above constraints. Then the "first probe curve" is brought into play. This curve is a predefined line fixed with respect to A, B and C. The first probe curve is then searched for a point $D_1$, which lies on the surface. The arc length along the first probe curve to the point $D_1$, from some predetermined starting point on the curve, is then taken as the first component $f_1$ of the feature vector.

A second probe curve is a curved line which is described by a fixed predetermined rule mapping the currently placed points A, B, C and D into a unique curved line. Then, just as the first probe curve yielded the surface intersection point $D_1$ and the first component $f_1$ of the feature vector, the second probe curve is used in the same way to yield surface intersection point $D_2$ and the second component $f_2$ of the feature vector. All subsequent probe curves are defined similarly.

Specifically, in generating a feature vector component $f_n$, a fixed predetermined rule is used for mapping points A, B, C, $f_1, \ldots f_{n-1}$ into a unique nth probe curve. Then this probe curve is searched for a point $D_n$ which lies on the surface. The arc length along this probe curve from a predetermined starting point on the curve to the point $D_n$ is taken as the feature vector component $f_n$. As an example, FIG. 1c shows A which uses nine "hinge angles" noted as 1–9.

In generating the point, $D_9$, the circular probe curve is determined by three previously placed points, A, B, and $D_3$. $D_3$ is the point at the bottom center where edges 6 and 9 meet. The probe circle is coaxial with specified reference point, which is A. The arc length is measured (in degrees) around the circle from A to the surface point $D_9$. The feature vector component $f_9$ (called $\theta_9$ in this example) is 180° for a planar surface, for example. The units of measure for arc length are, in the general TO case, arbitrary, and can be any monotonic function of the usual Euclidean distance along a curve.

Definitions of several types of pose to facilitate the following descriptions are noted for clarification. It will be noted in FIG. 3 that a number of items are shown in relation to a coordinate system fixed with respect to the range scanner, i.e., the range imaging instrument which acquires the images of the object in "test position" and in "training position". For example, a TO placement is shown on the image of each object. An "object- pose" is defined to be the rigid motion that takes the training image of the object into alignment with the image for which the object-pose is desired. This requires six parameters, e.g., three translational parameters, and three rotational ones. It is well known to those skilled in the art of computer vision or robotics how to represent pose in various mathematical forms. The "TO-pose" of a TO is defined as the rigid motion that takes the points A, B, and C of the TO placement in a prespecified "standard position" into the corresponding points A, B, and C of the TO whose TO-pose is desired. "Relative pose" of two three-dimensional point sets (e.g., TOs or range images of objects) is defined to be in rigid motion that brings the first point set into alignment with the second point set. Object-TO-pose is defined to consist of two parts: first, a description of the location of a predefined central reference point on an object in a coordinate system fixed with respect to the triangle ABC, and secondly, a description of the relative pose of the triangle ABC as it lies on the object and the triangle ABC as it lies on the same place on the object with the object in a prespecified training position.

A tripod placement is said to be pose-distinctive if all other placements on the same training object giving nearly the same feature vector have nearly the same pose in 6 degrees of freedom (DOF) with respect to the object. Thus a trihedral corner is not pose distinctive because there are three TO placements 120 degrees apart that give the same feature vector. Irregular or freeform shapes tend to have lots of pose-distinctive placements on them; symmetrical things have few. More precisely, a tripod operator (TO) placement P is said to be epsilon-delta pose distinctive if and only if all other placements which have a feature vector within a distance $\epsilon$ of that of P also have object-TO-poses within a distance $\delta$ of the object-TO-pose of P, using appropriate metrics in the two spaces. Specifically, an $L_2$ (Euclidean) metric is used to compute distances in feature space. For pose, the metric is slightly more complicated.

The distance between two object-TO-poses is regarded as characterizing how far an object would have to be moved to take it from one object-TO-pose to a second. The distance is defined to be the $L_2$ norm (root sum- of-squares) of the 4-vector (X, Y, Z, A) where X, Y, Z, are the Cartesian coordinates of the translation of a central reference point $p_{ref}$ in the object from one pose to a second, and A is the product of a scalar constant called posemetric and the angle in radians of the net rotation between the two poses. It is well known to those skilled in the art of computer vision or robotics how to compute this net rotation using "axis-angle" rotation representations. Posemetric is roughly the average radius of the object, so that A is a rough measure of the distance moved by surface points due to rotation.

Training Phase

During the training portion of the algorithm, as shown in FIG. 4, TOs are placed at many (e.g., 50,000) places on the computer-represented surface shape, such as a range image or a computer assisted design model. For each such placement 114, the system stores 116 the resulting feature vector ($f_1$, f2, . . . $f_d$) and the associated information about the relative pose of the TO and the represented surface shape, after first computing such information. This is done by computing in the coordinate system of the represented surface shape the rigid motion which takes the triangle ABC of the TO from a prespecified "standard position" into its current position on the surface. It is well known by those skilled in the art how to accomplish this function, using a variety of representations of the six parameters of rotation and translation.

A test 118 is made to determine if the feature space signature has been sampled densely enough to allow the desired pose estimation accuracy. This density is measured by the RMS Euclidean distance between each feature vector and its nearest neighbor. Other measure of average besides RMS can be used and other metrics than Euclidean can be used.

The stored data for the training placements are screened for usefulness in pose estimation 122, and some are rejected, using "non-pose-distinctive" placement removal. This corresponds to ambiguous shapes, particularly those possessing symmetries. Non-pose-distinctive placement removal is performed during the training process as follows: First, make numerous TO placements on the object of interest, and store them. Then make numerous new placements, each of which is tested against the stored placements in an effort to prove them non-pose-distinctive. Specifically, if any stored placement is near the nearer than $\epsilon$ to the new one in feature space, but farther than $\delta$ from it in pose space, then it is discarded. This testing continues until a specified number of consecutive new placements are tried without it resulting in the removal of any stored placement. A stored point set with most or all non-pose-distinctive placements removed is called a "pose-distinctive signature." An alternative to stored data for the training placements are screened for usefulness in pose estimation 122 is to utilize the pill box method 124.

The Naive Method

In order to more clearly explain pose estimation utilizing a pose-distinctive signature, a simple version of the method and its shortcomings is described hereafter. After prestoring the feature vector and associated six pose parameters for many TO placements on a model surface, a TO is placed at random location on a new range image containing the object of interest. The nearest neighbor in feature space is sought. The nearpoint is found; that prestored point whose sum-of-squares distance to the newly measured feature vector is smallest, as in the recognition problem (without pose estimation) described in Pipitone; TRIPOD OPERATORS FOR REALTIME RECOGNITION OF SURFACE SHAPES IN RANGE IMAGES; NASA Tech. 2004 Symp., Washington, D.C., November 1994, which is hereby incorporated in total herein. If this distance is less than some appropriate small threshold, then the surface is recognized and pose estimation can proceed. This is done by computing the TO-pose (six parameters) of the central triangle A, B, C of the new placement in the coordinate system of the range imaging instrument, just as in the training phase. Then the object-TO-pose parameters associated with the nearpoint above are retrieved. If the newly measured feature vector and its nearpoint among the prestored data correspond to TO placements at the same location on the surface shape, then a recovery of an estimate of the object-TO-pose of the surface shape in the new image from those two pose 6-vectors is accomplished. That is, the pose of the central triangle in the new image is known, and the retrieved pose of the central TO triangle in the triangle image, and the disparity between these two poses represents where the object (surface shape) actually is with respect to the location of its original model.

One deficiency of the naive foregoing technique is that when the feature vector "matches" the prestored data in that a very close nearpoint is found, the two corresponding placements of the TO may not lie on the same place on the surface. This is particularly common in symmetrical surfaces-such as surfaces of revolution, linear extrusions, planes, spheres, cylinders, trihedral corners, etc. These surfaces shapes do not allow the unambiguous determination of all six pose parameters.

When a pose-distinctive signature is used in pose estimation, it is used just as in the naive method above, except that there will now be few problems with pose ambiguity. Specifically, in performing pose estimation, the TO is placed at random locations on the range image within some region, perhaps the whole image, believed to contain the object of interest. A given placement either results in no pose estimate, because it is not close to any feature-space point in the signature, or it returns a pose estimate. In the former case, the TO placement either does not lie on the desired object or it lies on a "symmetrical" or otherwise pose-ambiguous region of the object.

Pillbox Algorithm

A second deficiency of the pose estimation method described in the naive method earlier is that the stored points are discrete. This means that the more resolution desired in the pose, the more points that must be stored in the computer memory. Referring again to FIG. 4, this tradeoff can be mitigated by making piecewise smooth approximations of the data 124 in such a way that the measured point in feature space is mapped by six scalar functions into six corresponding pose parameters. This is called the "pillbox method." Each pillbox defines a small compact volume of feature space within in which a linear 3-manifold approximations the set of stored feature space points in that region. Also, a linear mapping is established within the pillbox from feature space to pose space. a union of a number of pillboxes then can represent an extended region of a surface.

Referring again to 124 in FIG. 4, the algorithm a pillbox representation is made of a small piece of feature space allowing fast mapping from feature values to the six pose parameters. This is done for a sufficiently large number of pieces of feature space so that a reasonable large fraction of the pose-distinctive part of a feature-space signature can be covered by a union of the pillboxes. Some of this description is somewhat computer-oriented, using specific variable and array names, because it is based on text used to describe the algorithm to a programmer in order for it to be implemented.

Then the following steps are accomplished:

(1) Take a random point "centerplace" in placement space, yielding a feature vector $f_c$ and a pose vector "centerpose."

(2) Take additional placements at many points "near" "centerplace" in placement space. Then pick ranges of values for the TO placement parameters i, j and $\theta$ (defined in Pipitone, supra, 1994) and take points randomly or uniformly within the ranges. For each placement made, the six corresponding object-TO-pose parameters are computed and stored along with the corresponding feature vector $(f_1, f_2, \ldots, f_d)$ which is preferably of dimension $4 \leq d \leq 20$.

(3) Retain only those of (2) whose pose is within some specified distance "pose_spread" of "centerpose." Measure the pose distance as described in the definition described earlier. It is possible that "pose_spread" is large enough to cover as large a piece of the signature as possible without encountering a severe deviation from linearity, either for the feature point set approximation or for the feature space to pose mapping.

(4) In order to fit a linear manifold in feature space to the placements from (3) compute the eigenvalues of the scatter matrix of the feature space points, a method well known to those skilled in the arts of statistics and computer vision. What is desired is three "large" eigenvalues and d-3 "small ones, indicating a fully 3D manifold in feature space. Otherwise the "centerplace" will be aborted and the algorithm started somewhere else. An aborted try usually means that either the linear manifold is less than three dimensional due to surface symmetry, or it is more than three dimensional due to high curvature, in which case a linear fit would be poor.

(5) Make a "pillbox" around the feature space linear patch of (4). The pillbox is a "hypercylinder" of radius $d_r$ centered on $f_c$." The 3 orthogonal radial directions, the eigenvectors of the 3 largest eigenvalues, are the tangents, d-3 other orthogonal directions are normals. Call these the $t_1, t_2, t_3, n_1, n_2, n_3, n_4, \ldots$ respectively. The pillbox is defined by imposing the radius "$d_r$" (radial) and a thickness $2d_t$ (tangential);

Let $df=(f-f_c)$ be (the feature vector)−(the center of the pillbox in fspace). This is a d−dimensional vector. Then the pillbox is defined by $(df.t_1)+(df.t_2)^2+(df.t_2)^2<d^2_r$, and $(df.n_1)^2+(df.n_2)^2+(df.n_3)^2+ \ldots <d^2_t$ (6) Make a 6×(d+1) matrix which maps a feature vector f into the 6 pose parameters, for f within the pillbox. Do this by separately treating each of the 6 pose parameters as a linear function of f; e.g., $P1=a+c_1f_1+c_2f_2+ \ldots +c_9f_9$ for pose parameter number1 of the six. This is a standard linear regression problem in the field of statistics; minimizing the mean squared error of the linear approximation leads to an order d+1 linear system.

(7) Test the pillbox by making random placements all over placement space. For each one falling inside the pillbox in feature space, check to see that its recovered pose is within some tolerance t of the actual pose for that placement using the posemetric. This step eliminates non-pose-distinctive points as well as points for which the linear mapping is not a sufficiently accurate approximation 114.

The foregoing algorithm allows the system to place the TO on a test image (102, 104, 106, 108 and 112 of FIG. 5) and rapidly give one of these two distinctive responses:

(1) This is a "pose-distinctive" placement on the desired object, and here are the six pose parameters.

(2) This is not useful, i.e., either the TO is not on the desired object, or it is on a place on the object that is confusable with another object, or the placement is not "pose-distinctive."

Pose Estimation Phase

Figure 5:
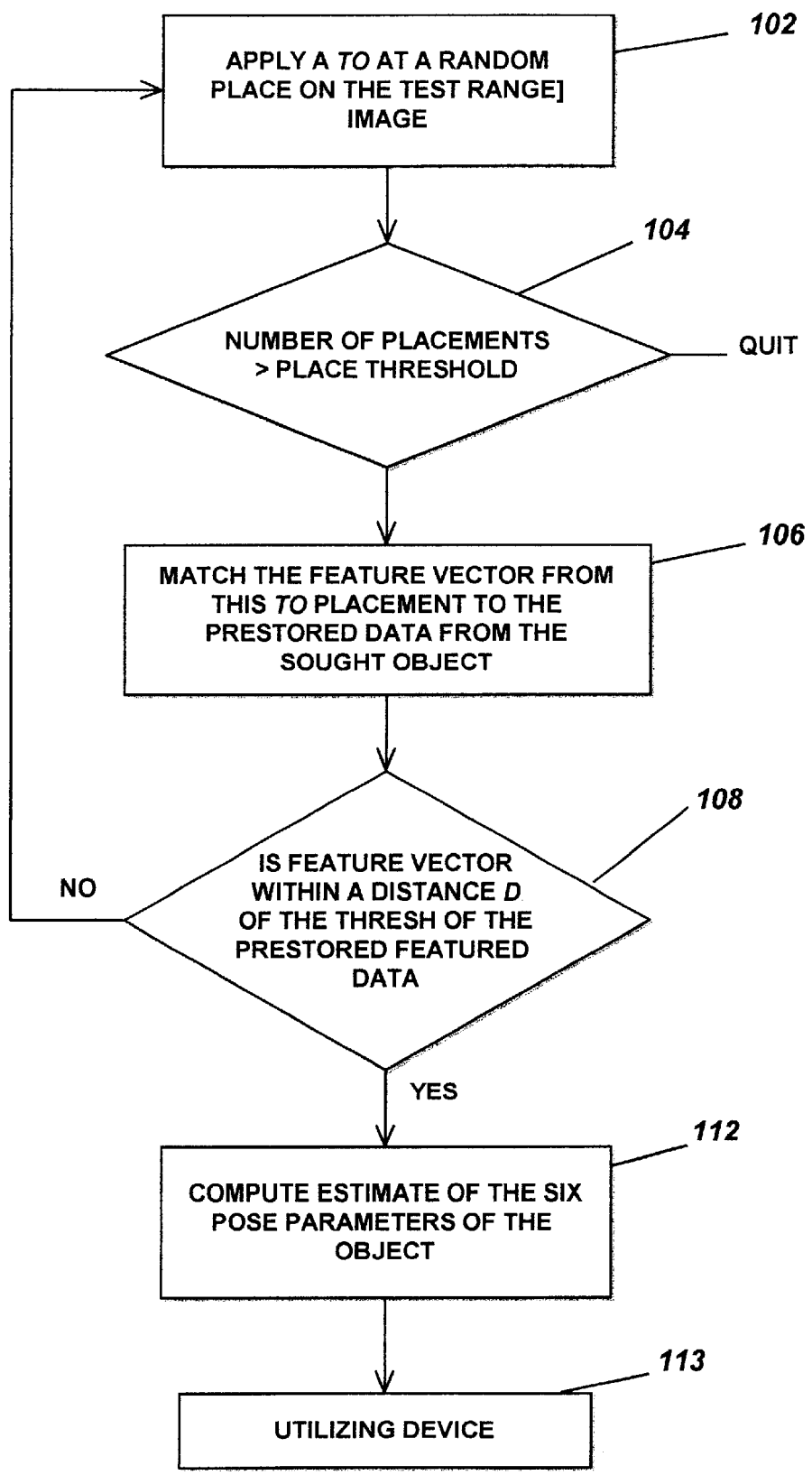
FIG. 5 shows a flow chart for the ideal description of pose estimation method using tripod operators.

The implementation of the pose estimation portion of the algorithm is described, as shown in FIG. 5. A single application of a TO on the test range image 102 is done by first selecting an arbitrary point on the range image to be Point A of the TO. By "point on the range image", it is meant that either an actual range pixel expressed as a Cartesian triple (x, y, z) or an interpolated point between adjacent pixels is selected; next, an arbitrary point on the range image at the prescribed distance |AB| from point A is chosen as point B. Finally, a point C on the range image is chosen such that it is at the prescribed distance |AC| from A and at the prescribed distance |BC| from B. Furthermore, A, B and C must occur consistently in a clockwise (or CCW) order, as viewed from the range image sensor. Having determined A, B and C, the d feature values $f_1$ through $f_d$ are computed according to "definition of a TO". Thus, at the end of step one 102, the 9 prototype feature values of $f_1$ through $f_d$ and the d+3 points A, B, C, $D_1, \ldots, D_d$ are stored in computer memory. The case of the failed TO placement must be discussed. If any of the d+3 points cannot be obtained, for any reason, the placement is aborted 104 and a fresh attempt begins at a different arbitrary point A 102. Failure usually occurs because valid range data is unavailable at the required location.

A test 104; if the number of TO placements exceeds some predefined threshold 102, quit. A reasonable value for this threshold is one corresponding to the maximum amount of time the user is willing to wait for a result in an application.

The distance between the feature vector ($f_1$ through $f_d$) 106 obtained in 102 and the nearest point in the prestored signature, 122 of FIG. 4, is computed, the FDIST. This distance may be computed using a variety of metrics, the familiar L2 (Euclidean) metric is preferred.

A test is made of whether FDIST is less than a prescribed threshold $D_{THRESH\ 1}$ 108. If not, the match fails and Step 102 is executed again. If so, the program proceeds to 112. $D_{THRESH}$ is selected so that it is small enough to exclude most false positive matches of surface shape, and large enough so that the results will not be mostly false negatives.

The pose estimates from the results of Step 102 and from prestored data from either 122 or, FIG. 4, are computed 112. Pose estimation is performed by first computing the pose (six parameters) of the central triangle ABC of the new TO placement in the coordinate system of the range imaging instrument, just as shown in 116, FIG. 4, of the training phase. This is the "TO-pose". Next the stored object-TO-pose parameters associated with the near point from Step 108, above are retreived using the data of either 122 or 124. In the discrete point case of training data from 122, indexing is done as described in Pipitone 1994, supra, except with pose estimation occurring, not just recognition. In the case of 124, instead of finding the nearest neighbor point in the prestored discrete feature point data, pillboxes are used for matching. This is accomplished by initially prestoring the set of pillboxes in feature space, indexed by an array, in 3 or 4 dimensions in feature space, whose cells point to the few pillboxes which overlap or nearly overlap that cell. Then during pose estimation, a pillbox is quickly recovered which contains the feature point obtained by the current TO placement, and is used to map from feature space to pose space. The stored pose parameters represent the TO pose in the coordinate system of the training image, with the TO lying on the same surface feature in both the training and test images. An estimate of the pose of the surface shape is then recovered in the new image from those two pose 6-vectors. That is, it is known the pose of the central triangle in the triangle image, and the disparity between these two poses represents where the object (surface shape) actually is with respect to the location of its original model. If the newly measured feature vector and its near point among the prestored data do indeed correspond to TO placements at the same location on the surface shape, then the object pose estimate will be exact.

The estimated object pose is then output to a utilizing device 113 which is either a device for humans to read, or a robotic device which will interact with the object at its known pose.

EXAMPLE

Figure 6A:
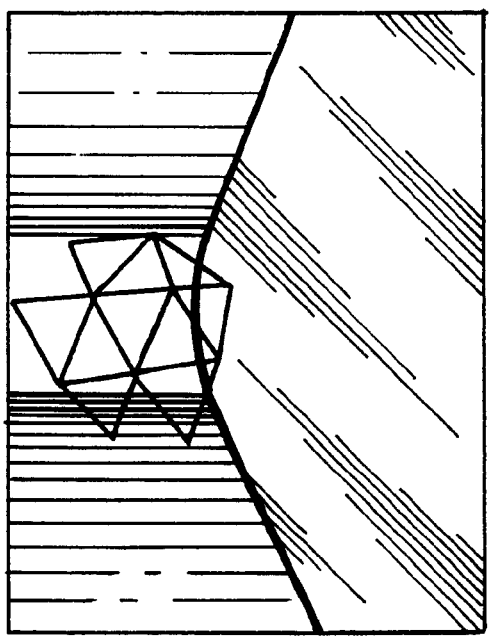
FIG. 6a shows a new image of object in test position for pose estimation for a trihedral corner with beveled edge, with a TO applied at a pose-distinctive place.
Figure 6B:
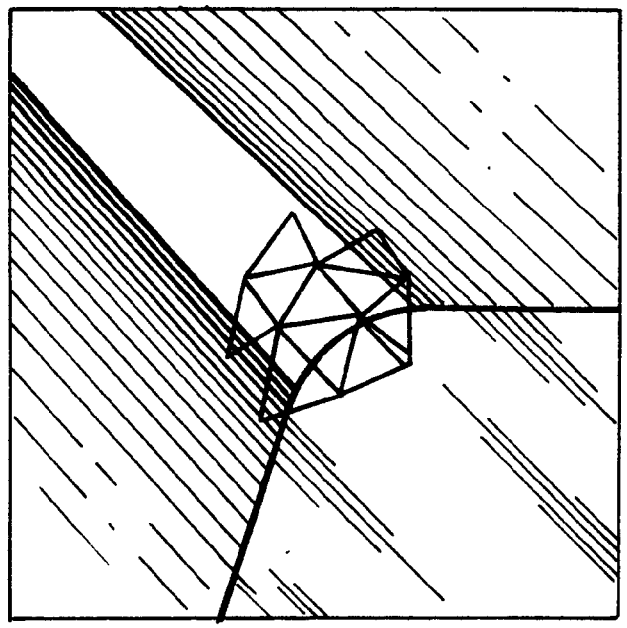
FIG. 6b shows a training image of object in original reference position for pose estimation for a trihedral corner with beveled edge with the estimated matching TO placement to that of FIG. 6a shown.

Referring again to FIGS. 3a and 3b, in an implementation of the full algorithm described above was made a surface shape (object) described as A and tested on beveled outside corner. The algorithm was implemented in "C" computer language; however any scientific language may be used, FIGS. 6a and 6b show a pose estimation experiment in which a synthetic range image was first generated of the desired surface shape in the "training position", FIG. 6b. After training the system by placing the TO many times on an image of the object in its "training position", the system stored the resulting a pillbox representation. A new range image of the object was generated, with noise added. in a different pose in 6 DOF, called the "test position". Then pose estimation was performed. This consists of automatically placing the TO at several positions on this image until the system found a pose-distinctive placement. The system was then displayed the place to which it believed the placement corresponded. This is the TO placement shown in FIG. 6*b*. The accuracy of the estimated placement of the 12-point TO is apparent to the eye. The system also computed corresponding numerical pose parameters. The total time for this pose estimation operation was less than 50 milliseconds using a Sun Microsystems SPARC 20 computer. The pose estimation procedure computes where it believes the "test placement" lies on the object, shown as "estimated matching tripod operator location 126, on FIG. 3*a*. In numerical terms, the system estimates six parameters describing the rigid motion taking the object from its training position 126, as shown in FIG. 3*a*, to its current position 128 in the test image. The translational component of the pose of the object 132 is related to a reference point 134, called $p_{ref}$ which is selected to be near the center of the object in the training phase. This facilitates the construction of a meaningful metric for pose difference.

Definitions (1) A point in placement space is (i, j, θ). This is the usual way of specifying where to place a TO on a range image, e.g., in the related TO work. (See, supra, Pipitone, 1994.)

(2) A point in feature space is $(f_1, f_2, \ldots, f_d)$, these are the "hinge angles" described above in the case of the implementated "linkable" type of TO, in the system.

(3) A point in object-TO-pose space is (coefAB, coefAC, coefcross, axangX, axangY, axangZ) in the test prototype. The first three give the location of a specified reference point "refpt" on the object, typically chosen more or less near its "center", in the reference frame of the tripod. See the included "get_cent_coefs( )", which generates the 3 coefficients and describes the recovery of refpt from A, B, C and the three coefficients. The command "ps" allows the user to change the pose status (recognition or pose estimation) and set the object reference point. The 3 "axang" numbers describe the orientation of the tripod with respect to the "standard orientation" defined in "orient3pts( )" ( an excerpt of the source code is shown in Appendix A). The 3-vector "axang" is oriented along the direction of the net rotation and has a magnitude equal to that of the net rotation. Various angle normalizations are used, as described in the code. The 6 pose numbers for each TO placement are stored as global variables, as follows (along with corresponding feature vectors):

float refcoefAB[50000], refcoefAC[50000], refcoefCROSS[50000]; short tri_orient[50000][3];
/* angle in 0.01 degree units. */

Although the invention has been described in relation to an exemplary embodiment thereof, it will be understood by those skilled in the art that still other variations and modifications can be affected in the preferred embodiment without detracting from the scope and spirit of the invention as described in the claims.

APPENDIX A

```
void orient3pts2(Box,Cox,Coy,A,B,C,axis,coshalfang)
        /* Debugged 5/2/95                                            */
/* Given triangle ABC, compute the rotation which takes it from      */
/* the orientation of the the triangle A0B0C0 in standard pose       */
/* to the orientation of ABC as given. Standard pose: A0 at          */
/* (0,0,0), B0 on +x axis, C0 in ++ quadrant of xy plane, so that    */
/* A0B0C0 occur in CW sequence when viewed in +z direction.          */
/* Rotation is by theta about computed                               */
/* axis. 0<=theta<=180deg. cos(theta/2) is computed. axis is         */
/* normalized to sin(theta/2), so a true quaternion is computed.     */
/* The 3 nonzero components of A0B0C0 are given for computational    */
/* expediency. See quatprod( ) for conventions.                      */
double B0x,C0x,C0y,A[ ],B[ ],C[ ],axis[ ], *coshalfang;
{
    double  ABx,ABy,ABz,ACx,ACy,ACz,normal_x,normal_y,normal_z,
            norm,tnorm,axis1x,axis1y,costheta1,sintheta1,halfsin1,
            halfcos1,ax_cross_AB_x,ax_cross_AB_y,AB1x,AB1y, axdotAB,
            dBx,BBsqr,halfsin10,halfcos10,axis10z;
    ABx = B[X]-A[X];
    ABy = B[Y]-A[Y];
    ABz = B[Z]-A[Z];
    ACx = C[X]-A[X];
    ACy = C[Y]-A[Y];
    ACz = C[Z]-A[Z];
        /* Compute normal of triangle ABC: */
    normal_x = ABy*ACz-ABz*ACy;      /* cross product */
    normal_y = ABz*ACx-ABx*ACz;
    normal_z = ABx*ACy-ABy*ACx;
    tnorm = sqrt(normal_x*normal_x + normal_y*normal_y + normal_z*normal_z);
    normal_x /= tnorm; /* normalize to unity */
    normal_y /= tnorm;
    normal_z /= tnorm;
        /* Compute axis vector such that a rotation of ABC CLOCKWISE about */
        /* it aligns the 2 planes:                         */
    axis1x = normal_y; /* This is ABCnormal cross unit z*/
    axis1y = -normal_x;
    norm = sqrt(axis1x*axis1x+axid1y*axid1y);
    if (norm < .00001){
        /*printf("Triangles approximately coplanar ");*/
        costheta1 = 1.0;
```

APPENDIX A-continued

```
            AB1x = ABx;
            AB1y = ABy;
            goto zrot; /* Proceed to z rotation */
    }
            /* Compute unit axis vector: */
axis1x = axis1x/norm;
axis1y = axis1y/norm;
            /* Rotate B into xy plane using Rodriguez' formula: */
    sintheta1 = norm;       /* Magnitude of crossprod of normals */
    costheta1 = normal_z; /* Dotproduct of triangle normals */
    ax_cross_AB_x = axis1y*ABz;
    ax_cross_AB_y = -axis1x*ABz;
    axdotAB = axis1x*ABx +
    AB1x = costheta1*ABx +
            sintheta1*ax_cross_AB_x +
            (1.0-costheta1)*axdotAB*axis1x;
    AB1y = costheta1*ABy +
            sintheta1*ax_cross_AB_y +
            (1.0-costheta1)*axdotAB*axid1y;
/*printf("\nAB1x=%f    AB1y=%f ",AB1x,AB1y);*/
        /* Find rotation about z axis that orients AB0 to AB1: */
zrot:dBx = AB1x - B0x;
    BBsqr = dBx*dBx + AB1y*AB1y;
    halfsin10 = sqrt(BBsqr)/(2.0*B0x);
    halfcos10 = sqrt(1 - halfsin10*halfsin10);
            /* NOTE: zsign: CCW+ iff AB1y > 0. */
    if (AB1y > 0.0) axis10z = -halfsin10; /* Normalize axis 10 to sine of half angle */
    else            axis10z = halfsin10;
        /* Compute resultant quaternion aligning ref to ABC: */
    halfsin1 = sqrt((1.0-costheta1)/2.0);
    halfcos1 = sqrt((1.0+costheta1)/2.0);
    axis1x = axis1x*halfsin1; /* Normalize axis 1 to sine of half angle */
    axis1y = axis1y*halfsin1;
/*printf("\nPLANE ALIGNMENT: coshalfang = %f    axis = %f %f %f",
        halfcos1,axis1x,axis1y,0.0) ;*/
/*printf("\nang=%f deg. ",2.0*57.2958*acos(halfcos1));*/
/*printf("\nWITHIN PLANE: coshalfang = %f    axis = %f %f %f",
        halfcos10,0.0,0.0,axis10z);*/
/*printf("\nang=%f deg. ",2.0*57.2958*acos(halfcos10));*/
    quatprod(halfcos10, 0.0, 0.0, axis10z,
            halfcos1, axis1x, axis1y, 0.0,
            coshalfang,&axis[X],&axis[Y],&axis[Z]);
}
void get_cent_coefs(A,B,C,cent,coefAB,coefAC,coefcross)
/* Given an instance of A,B,C and cent with correct relative positions */
/* (cent is a chosen model reference point), find 3 coeficients so that*/
/* cent = coefAB*(B-A)+coefAC*(C-A)+coefcross*((B-A)X(C-A))+A.          */
double A[ ],B[ ],C[ ],cent[ ],*coefAB,*coefAC,*coefcross;
{
    double ABx,ABy,ABz,ACx,ACy,ACz,crx,cry,crz,bx,by,bz,d,
        swapAB, swapAC, swapcr, swapb;
    ABx=B[X]-A[X]; ABy=B[Y]-A[Y]; ABz=B[Z]-A[Z];
    ACx=C[X]-A[X]; ACy=C[Y]-A[Y]; ACz=C[Z]-A[Z];
    crx = ABy*ACz - ABz*ACy;
    cry = ABz*ACx - ABx*ACz;
    crz = ABx*ACy - ABy*ACx;
    bx = cent[X] - A[X];
    by = cent[Y] - A[Y];
    bz = cent[Z] - A[Z];
/*   Here is linear system:                                            */
/*                                                                     */
/*   ABx*coefAB + ACx*coefAC + crx*coefcross = bx                      */
/*   ABy*coefAB + ACy*coefAC + cry*coefcross = by                      */
/*   ABz*coefAB + ACz*coefAC + crz*coefcross = bz                      */
/*
printf("\n%f %f %f   %f",ABx,ACx,crx,bx);
printf("\n%f %f %f   %f",ABy,ACy,cry,by);
printf("\n%f %f %f   %f\n",ABz,ACz,crz,bz)
*/
        /* Solve 3rd order linear system for coefficients: */
    if (fabs(ABx)<.0001*fabs(ABy))){          /* Need to pivot! */
        printf("\nPIVOT; fabs(ABx)<.0001*fabs(ABy) ! ! ! ! ! ");
        swapAB=ABx; swapAC=ACx; swapcr=crx; swapb=bx;
        ABx=ABy;       ACx=ACy;       crx=cry;       bx=by;
        ABy=swapAB; ACy=swapAC; cry=swapcr; by=swapb;
    }
    d=ABy/ABx;
    ACy=ACy-d*ACx; cry=cry-d*crx; by=by-d*bx;
    d=ABz/ABx;
```

APPENDIX A-continued

```
        ACz=ACz-d*ACx;  crz=crz-d*crx;  bz=bz-d*bx;
/*
printf("\n%f %f %f    %f",ABx,ACx,crx,bx);
printf("\n%f %f %f    %f",ABy,ACy,cry,by);
printf("\n%f %f %f    %f\n",ABz,ACz,crz,bz);
*/
        if (fabs(ACy)<.0001*fabs(ACz)){       /* Need to pivot! */
            printf("\nPIVOT; fabs(ACy)<.0001*fabs(ACz) ! ! ! ! ! ");
            swapAC=ACz;  swapcr=crz;  swapb=bz;
            ACz=ACy;     crz=cry;     bz=by;
            ACy=swapAC;  cry=swapcr;  by=swapb;
        }
        d=ACz/ACy;
        crz=crz-d*cry;  bz=bz-d*by;
/*
printf("\n%f %f %f    %f",ABx,ACx,crx,bx);
printf("\n%f %f %f    %f",ABy,ACy,cry,by);
printf("\n%f %f %f    %f\n",ABz,ACz,crz,bz);
*/
        *coefcross=bz/crz;
        *coefAC=(by-cry*(*coefcross))/ACy;
        *coefAB=(bx-ACx*(*coefAC)-crx*(*coefcross))/ABx;
}
```

What is claimed is:

1. A computer system for computing an estimated pose of an object from a range image containing the object, comprising:

a computer for receiving scanned digital representation of known objects and performing the steps of:
   (a) applying a tripod operator at a random place on a digital representation of a surface shape whose pose it is later desired to estimate in the range image;
   (b) storing in a computer memory the feature vector and the relative pose of the tripod operator and the surface shape;
   (c) calculating if the density of the feature vector is greater than some predetermined threshold;
   (d) if the density of the feature vector is not greater than some predetermined threshold, reapplying a tripod operator, as in (a);
   (e) if the density of the feature vector is greater than some predetermined threshold, performing non-distinctive placement removal on the data in (b);

said computer after receiving scanned digital representation of an unknown object known as a test range image and performing the steps of:
   (f) applying a tripod operator at a random place on the test range image;
   (g) matching a feature vector from (f) to the stored data in (b) for the unknown object;
   (h) if the feature vector is not within a predetermined distance of the stored feature data, reapplying a tripod operator, as in (f);
   (i) if the feature vector is within a predetermined distance of the stored feature data, computing an estimate of six pose parameters of the unknown object; and a utilizing device to receive the six pose parameters.

2. A computer system for computing an estimated pose of an object from a range image containing the object, comprising:

a computer for receiving scanned digital representation of known objects and performing the steps of;
   (a) applying a tripod operator at a random place on a digital representation of a surface shape whose pose it is later desired to estimate in the range image;
   (b) storing in computer memory the feature vector and the relative pose of the tripod operator and the surface shape;
   (c) calculating if the density of the feature vector is greater than some predetermined threshold;
   (d) if the density of the feature vector is not greater than some predetermined threshold, reapplying a tripod operator, as in (a);
   (e) if the density of the feature vector is greater than some predetermined threshold, converting the stored data into a compact piecewise analytic description;

said computer after receiving scanned digital representation of an unknown object known as a test range image performs the steps of:
   (f) applying a tripod operator at a random place on the test range image;
   (g) matching a feature vector from (f) to the stored data in (b) for the unknown object;
   (h) if the feature vector is not within a predetermined distance of the stored feature data, the computer reapplying a tripod operator, as in (f);
   (i) if the feature vector is within a predetermined distance of the stored feature data, computing an estimate of six pose parameters of the unknown object; and a utilizing device to receive the six pose parameters.

3. A process for computing an estimated pose of an object from a range image containing the object, comprising:

receiving scanned digital representation of known objects and
   (a) applying a tripod operator at a random place on the digital representation of a surface shape whose pose it is later desired to estimate in the range image;
   (b) storing in computer memory the feature vector and the relative pose of the tripod operator and the surface shape;
   (c) calculating if the density of the feature vector is greater than some predetermined threshold;
   (d) reapplying a tripod operator, as in (a); if the density of the feature vector is not greater than some predetermined threshold,
   (e) performing non-distinctive placement removal on the data in (b); if the density of the feature vector is greater than some predetermined threshold, after receiving scanned digital representation of an unknown object known as a test range image;
(f) applying a tripod operator at a random place on the test range image;
(g) matching a feature vector from (f) to the stored data in (b) for the unknown object;
(h) reapplying a tripod operator, as in (f); if the feature vector is not within a predetermined distance of the stored feature data,
(i) computing an estimate of six pose parameters of the unknown object; if the feature vector is within a predetermined distance of the stored feature data, and applying the six pose parameters to a utilizing device.

4. A process for computing an estimated pose of an object from a range image containing the object, comprising:

receiving scanned digital representation of known objects and
(a) applying a tripod operator at a random place on the digital representation of a surface shape whose pose it is later desired to estimate in the range image;
(b) storing in computer memory the feature vector and the relative pose of the tripod operator and the surface shape;
(c) calculating if the density of the feature vector is greater than some predetermined threshold;
(d) reapplying a tripod operator, as in (a), if the density of the feature vector is not greater than some predetermined threshold,
(e) converting the stored data into a compact piecewise analytic description, if the density of the feature vector is greater than some predetermined threshold, after receiving scanned digital representation of an unknown object known as a test range image;
(f) applying a tripod operator at a random place on the test range image;
(g) matching a feature vector from (f) to the stored data in (b) for the unknown object;
(h) reapplying a tripod operator, as in (f), if the feature vector is not within a predetermined distance of the stored feature data,
(i) computing an estimate of six pose parameters of the unknown object, if the feature vector is within a predetermined distance of the stored feature data; and applying the six pose parameters to a utilizing device.

* * * * *